United States Patent
Hoffa

[19]

[11] Patent Number: 6,086,760
[45] Date of Patent: Jul. 11, 2000

[54] ULTRAVIOLET STERILIZER ASSEMBLY FOR USE IN FISH TANKS

[76] Inventor: Gary Hoffa, 7575 University Ave., La Mesa, Calif. 91941

[21] Appl. No.: 09/211,820

[22] Filed: Dec. 15, 1998

[51] Int. Cl.$^7$ .............................. C02F 1/32; A01K 63/04
[52] U.S. Cl. ...................... 210/205; 210/232; 210/416.2; 422/186.3; 119/264
[58] Field of Search .................................. 210/198.1, 205, 210/169, 416.2, 232, 748; 422/186, 186.3; 119/259, 264; 250/436, 437

[56] References Cited

U.S. PATENT DOCUMENTS

| | | | |
|---|---|---|---|
| 3,487,935 | 1/1970 | Lovitz | 210/169 |
| 3,971,947 | 7/1976 | Lambert et al. | 250/437 |
| 4,274,970 | 6/1981 | Beitzel | 210/748 |
| 5,178,758 | 1/1993 | Hwang | 210/205 |

*Primary Examiner*—David A. Simmons
*Assistant Examiner*—Frank M. Lawrence
*Attorney, Agent, or Firm*—Charles C. Logan, II

[57] ABSTRACT

An ultraviolet sterilizer assembly for use in fish tanks having a vertically oriented tubular housing that forms a sterilizer chamber therein. A top cap and a bottom cap close the respective open ends of the tubular housing. A vertically oriented elongated ultraviolet lamp is positioned in the sterilizer chamber of the tubular housing. A pair of inner tubular members extend substantially the length of the tubular housing and they are mounted in close proximity to the ultraviolet lamp. The bottom ends of the inner tubular members are joined by a tubular connector. The top cap has manifold housing portion having an inlet passageway connected to the top end of one of the inner tubular members and an outlet passageway connected to the top end of the other tubular member. An inlet port and an exhaust port allows the respective passageways to be connected to an outside source of water that is to be sterilized by passing it downwardly through one of the inner tubular members in close proximity to the ultraviolet lamp and then upwardly through the other inner tubular member in close proximity to the ultraviolet lamp to irradiate or kill small organisms and sanitize the water. A support bracket assembly allows the ultraviolet sterilizer assembly to be supported on the outside of the wall of a fish tank.

8 Claims, 1 Drawing Sheet

ULTRAVIOLET STERILIZER ASSEMBLY FOR USE IN FISH TANKS

BACKGROUND OF THE INVENTION

The invention relates to fish tanks and aquariums and more specifically to an ultraviolet sterilizer assembly to be used to sanitize their water.

The use of ultraviolet lamps to sterilize water in fish tanks and aquariums is not new. Existing systems are extremely inefficient and only have a 35 to 60 percent kill rate of harmful micro organisms on the initial pass through the sterilizing chamber. These units normally have the ultraviolet lamp in direct contact with the water. Some of these units do not direct the flow of water through the sterilizing chamber so that it always travels at least the length of the ultraviolet lamp. Sometimes the flow of water passes the ultraviolet lamp as far as two inches or more away from the lamp itself which seems to explain some of the low kill rate in existing ultraviolet lamp sterilizer units.

It is an object of the invention to provide a novel ultraviolet sterilizer assembly for use in fish tanks that has a kill rate of over 98 percent of the harmful organisms on the initial pass through the chamber.

It is also an object of the invention to provide a novel ultraviolet sterilizer assembly that eliminates single-cell algae to provide for crystal-clear aquariums.

It is another object of the aquarium to provide a novel ultraviolet sterilizer assembly that will have maximum efficiency in reducing the risk of disease outbreak in aquariums.

It is an additional object of the invention to provide a novel ultraviolet sterilizer assembly that may be quickly and easily installed on the wall of a fish tank.

It is a further object of the invention to provide a novel ultraviolet sterilizer assembly that has structure which allows the ultraviolet lamp to be changed without the necessity of disconnecting the water hoses leading to and from the unit.

SUMMARY OF THE INVENTION

A novel ultraviolet sterilizer assembly is the most efficient way to achieve a healthy and crystal clear aquarium, free of algal blooms. Advance technology has been incorporated in the design of the sterilizer, enabling it to perform up to three-times more effectively than existing units. The ultraviolet sterilizer assembly has a unique travel path that takes water through a U-shaped path down a first quartz-tube inner tubular member through a U-shaped connector and up through a second quartz-tube inner tubular member. This design enables the water to make two passes along the entire length of the ultraviolet lamp at an ideal average distance of ¼ inch from the lamp. The result is a total ultraviolet exposure time of over 5 seconds. In addition, the tubular housing of the sterilizer assembly is lined with a highly-reflective, anodized-aluminum sleeve to increase ultraviolet exposure. This design produces ideal dosages of ultraviolet light, eliminating over 98 percent of the harmful micro-organisms on the initial pass through the sterilizer chamber.

DESCRIPTION OF THE PREFERRED EMBODIMENT

Figures 1, 2, 3:
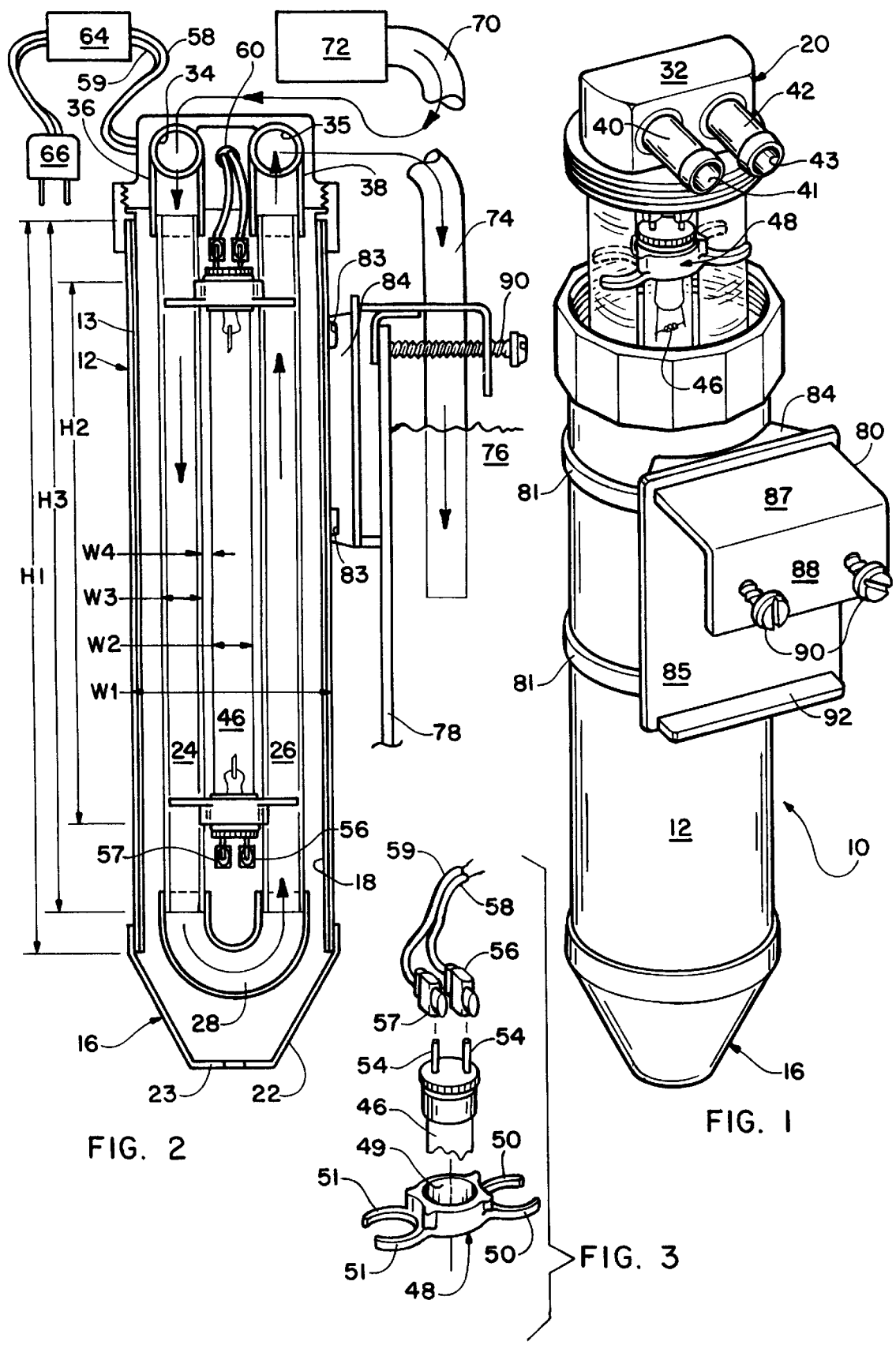
FIG. 1 is a front perspective view of the novel ultraviolet sterilizer assembly.
FIG. 2 is a cross sectional elevation view of the ultraviolet sterilizer assembly showing it mounted on the side walls of a fish tank.
FIG. 3 is an exploded front perspective view showing the manner in which the double clipped attachment attaches to the ultraviolet lamp.

The novel ultraviolet sterilizer assembly for use in fish tanks will now be described by referring to FIGS. 1–3 of the drawing. The ultraviolet sterilizer assembly is generally designated numeral 10.

Ultraviolet sterilizer 10 has a tubular housing 12 having a height H1 in the range of 5–24 inches and a width W1 in the range of 1.5–6 inches. The inner surface of tubular housing 12 is covered by an aluminum sleeve 13. An inverted cone-shaped bottom cap 16 closes the bottom end of tubular housing 12 forming a sterilizer chamber 18 therein. Top cap assembly 20 closes the top end of tubular housing 12. Bottom cap 16 has an annular side wall 22 and a disk-shaped bottom wall 23.

A pair of vertically oriented inner tubular members 24 and 26 are positioned in sterilized chamber 18 and their respective bottom ends are connected to a tubular U-shaped connector 28. The inner tubular members have a width W3 in the range of 0.3–1.5 inches and a height H3 in the range of 7–22 inches.

Top cap assembly 20 has a housing portion 32 having an inlet passageway 34 and an outlet passageway 35. A tubular sleeve 36 extends downwardly from inlet passageway 34 and telescopes over the top end of inner tubular member 24. A tubular sleeve 38 extends downwardly from outlet passageway 35 and telescopes over the top end of inner tubular member 26. A tubular sleeve 40 extends outwardly from inlet passageway 34 and it has an inlet port 41 at its front end. A tubular sleeve 42 extends outwardly from one end of outlet passage 35 and it has an exhaust port 43 at its front end.

An ultraviolet lamp 46 is positioned between the two inner tubular members 24 and 26 and held in position by a pair of double clip attachment members 48. Ultraviolet lamp 46 has a height H2 in the range of 6–23 inches, and a width W2 in the range of 0.3–1.5 inches. The spacing between the ultraviolet lamp 46 and the respective inner tubular members 24 and 26 is W4 and W4 is in the range of 0–1 inch.

Double clip attachment member 48 has a central bore hole 49 which telescopically receives ultraviolet lamp 46. A pair of spring fingers 50 and a pair of spring fingers 51 frictionally engage the respective inner tubular members 24 and 26. Ultraviolet lamp 46 has a pair of terminals 54 at its top end and its bottom end. These are detachably secured to electrical connectors 56 and 57. Electrical wires 58 and 59 pass through an aperture 60 in manifold housing 32. These wires 58 and 59 then go to a transformer 64 and then on to a male electrical plug 66.

A tubular hose 70 has its one end connected to inlet port 41 and its other end connected to a pump 72. Tubular hose 74 has its one end connected to exhaust port 43 and its other end is in the water 76 of a fish tank having a wall 78.

A support bracket 80 has a pair of cable ties 81 that pass through slots 83 in a block 84 extending from rear wall 85. Top wall 87 has a downwardly extending front wall 88 with a pair of laterally spaced leveling screws 90 passing therethrough for clamping onto wall 78 of the fish tank. A bottom flange 92 extends forwardly from rear wall 85 against wall 78 of the fish tank.

What is claimed is:

1. An ultraviolet sterilizer assembly for use in fish tanks, said ultraviolet sterilizer assembly comprising:

a vertically oriented elongated tubular housing having a top end, a bottom end, a height H1 in the range of 5–24 inches, a width W1 in the range of 1.5–6 inches, an inner surface, an outer surface and a sterilizer chamber formed in said tubular housing;

a vertically oriented elongated ultraviolet lamp having a top end, a bottom end, a width W2 in the range of 0.3–1.5 inches, a height H2, and electrical terminals; said ultraviolet lamp being positioned in said sterilizer chamber of said tubular housing;

a first and a second inner tubular member each having a top end, a bottom end, an inner surface, a height H3 and a width W3; said inner tubular members being positioned in said sterilizer chamber on diametrically opposite sides of said ultraviolet lamp; a tubular connector having its opposite ends secured to the respective bottom ends of said first and second inner tubular members and passing directly under said bottom end of said ultraviolet lamp;

at least one attachment member connecting said ultraviolet lamp to said respective first and second inner tubular members for supporting said ultraviolet lamp between said respective first and second inner tubular members in said tubular housing;

a bottom cap secured to and closing said bottom end of said tubular housing;

a top cap removably secured to and closing said top end of said tubular housing; means connecting said top ends of said first and second inner tubular members to said top cap so that their combined structure can be removed from said tubular housing along with said ultraviolet lamp as a single unit for the purpose of changing said ultraviolet lamp;

means for connecting an outside supply of water to be sterilized to said top end of said first inner tubular member so that water can pass downwardly through said first inner tubular member along the length of said ultraviolet lamp, then through said tubular connector and upwardly through said second inner tubular member along the length of said ultraviolet lamp and then exit said ultraviolet sterilizer assembly into an external container for the water that has been sterilized; and means for electrically connecting said electrical terminals of said ultraviolet lamp to a source of electrical power and said means passing through said top cap.

2. An ultraviolet sterilizer assembly as recited in claim 1 further comprising reflective means on said inner surface of said tubular housing.

3. An ultraviolet sterilizer assembly as recited in claim 2 wherein said reflective means is a tubular sheet of reflective material.

4. An ultraviolet sterilizer assembly as recited in claim 1 further comprising a support bracket assembly detachably secured to said outer surface of said tubular housing.

5. An ultraviolet sterilizer assembly as recited in claim 1 wherein said tubular connector is U-shaped.

6. An ultraviolet sterilizer assembly as recited in claim 1 wherein said inner tubular members are positioned diametrically opposite said outer surface of said ultraviolet lamp.

7. An ultraviolet sterilizer assembly as recited in claim 1 wherein said means for connecting an outside supply of water to be sterilized to said respective top ends of said first and second inner tubular members comprise: said top cap having a housing portion having an inlet port in communication with an inlet passageway that has an outlet end connected to said top end of said first inner tubular member; said housing portion also having an outlet port in communication with an outlet passageway that has an inlet end connected to said top end of said second inner tubular member.

8. An ultraviolet sterilizer assembly as recited in claim 1 wherein said means for electrically connecting said ultraviolet lamp to a source of electrical power includes a transformer.

\* \* \* \* \*